United States Patent
Yamaguchi

(10) Patent No.: US 7,590,176 B2
(45) Date of Patent: Sep. 15, 2009

(54) PARTIAL RESPONSE TRANSMISSION SYSTEM AND EQUALIZING CIRCUIT THEREOF

(75) Inventor: Kouichi Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 562 days.

(21) Appl. No.: 11/346,387

(22) Filed: Feb. 3, 2006

(65) Prior Publication Data
US 2007/0030890 A1   Feb. 8, 2007

(30) Foreign Application Priority Data
Aug. 5, 2005   (JP) ............................. 2005-227753

(51) Int. Cl.
*H03H 7/40* (2006.01)
(52) U.S. Cl. .................. 375/232; 375/285; 375/348; 708/323
(58) Field of Classification Search ........... 375/229, 375/230, 232, 233, 285, 346, 348, 349; 708/300, 708/301, 322, 323
See application file for complete search history.

(56) References Cited

U.S. PATENT DOCUMENTS

| | | | |
|---|---|---|---|
| 5,581,585 A * | 12/1996 | Takatori et al. ............. | 375/376 |
| 6,272,173 B1 * | 8/2001 | Hatamian .................... | 375/229 |
| 6,563,841 B1 * | 5/2003 | Nedic et al. ................. | 370/480 |
| 6,614,842 B1 * | 9/2003 | Chou et al. .................. | 375/232 |
| 7,012,957 B2 * | 3/2006 | Allpress et al. ............. | 375/233 |
| 7,346,104 B2 * | 3/2008 | Yu et al. ..................... | 375/233 |
| 7,346,645 B2 * | 3/2008 | Reynolds .................... | 708/819 |
| 2006/0188043 A1 * | 8/2006 | Zerbe et al. | |

OTHER PUBLICATIONS

Kabal et al., "Partial-Response Signaling," IEEE Transactions on Communications, vol. Com-23, No. 9, Sep. 1975, pp. 921-934.

* cited by examiner

*Primary Examiner*—Dav V Ha
(74) *Attorney, Agent, or Firm*—Foley & Lardner LLP

(57) ABSTRACT

A partial response transmission system in which a data signal is transmitted from a transmission side to a reception side through a transmission medium, includes an equalizing circuit provided in the transmission side or the reception side, and configured to adjust a transfer function for an entire system including the transmission medium to a desired transfer function by delaying input data over a plurality of states in units of a period equal to a transition time of a single bit response by the desired transfer function of a partial response transmission and by weighing and adding data in the plurality of stages; and a deciding circuit provided in the reception side and configured to decide an output data from a signal received through the transmission medium through processing under consideration of the desired transfer function.

15 Claims, 14 Drawing Sheets

DUO BINARY TRANSMISSION
TRANSFER FUNCTION

EYE OPENING

DUO BINARY TRANSMISSION
TRANSFER FUNCTION

EYE OPENING

PARTIAL RESPONSE TRANSMISSION SYSTEM AND EQUALIZING CIRCUIT THEREOF

BACKGROUND OF THE INVENTION

1. Field of the Invention

The present invention relates to a transmission system that carries out partial response transmission.

2. Description of the Related Art

In recent years, in information processing by a high-end server or a router, the performance in communication between an LSI and an external device is a bottleneck rather than the performance of a CPU inside the LSI. For this reason, the need of a large capacity transmission increases for electrical transmission between back boards or chips that employ a SerDes (Serializer/Deserializer) or the like.

One of methods of permitting the large capacity communication is speed-up of signal transmission. However, in transmission employing as a medium a PCB (Printed Circuit Board) used in a computer or the like, it is not easy to speed up the signal transmission. Increasing the transmission speed results in increasing the frequency of a signal. However, since a frequency band is limited depending on the medium, its waveform largely attenuates in a high-frequency signal, so that it is impossible to detect data correctly by a receiving circuit.

By the way, partial response transmission is known as a technique that allows high-speed transmission while using a limited frequency band, as described in "Partial Response Signaling" by PETER KABAL and SUBBARAYAN PASUPATHY (IEEE TRANSACTIONS ON COMMUNICATIONS, VOL. COM-23, NO. 9 SEPTEMBER 1975). In the partial response transmission, it is possible to narrow the frequency band by accepting intersymbol interference that can be removed through logical processing or the like. In the partial response transmission there are various methods depending on types of intersymbol interference, and methods such as duobinary method, and partial response II method are known.

The intersymbol interference in the duobinary method is expressed as $1+z^{-1}$, while the intersymbol interference in the partial response II method is expressed as $1+2z^{-1}+z^{-2}$, where z means a delay of 1 bit. Therefore, $1+z^{-1}$ in the duobinary method indicates that, data in which data immediately before current data by 1 bit data is added to the current data due to intersymbol interference, is reception data. Therefore, original data can be determined from the reception data, considering intersymbol interference. For this reason, in the partial response transmission, a transfer function of the entire transmission system is adjusted by an equalizing circuit so that desired intersymbol interference is caused.

FIG. 16 is a block diagram showing the configuration of a conventional partial response transmission system. Referring to FIG. 16, the conventional partial response transmission system has a transmission side equalizing circuit 1602, a transmission medium 1603, a reception side equalizing circuit 1604, and a deciding circuit 1606. The transmission side equalizing circuit 1602 equalizes an original data 1601 and then transmits it to the transmission medium 1603. The waveform of a signal transferred through the transmission medium 1603 is largely attenuated and then is received as a weak signal including intersymbol interference by the reception side equalizing circuit 1604. The reception side equalizing circuit 1604 equalizes the signal received from the transmission medium 1603 and then transmits it as a partial response signal 1605 to the deciding circuit 1606. The deciding circuit 1606 decides the original data based on the partial response signal 1605 sent from the reception side equalizing circuit 1604 and then outputs the decided result as a data output 1607.

The transmission side equalizing circuit 1602 has delay circuits 1608 to 1610, multiplying circuits 1611 to 1615, and an adding circuit 1616. The delay circuits 1608 to 1610 are connected in series and sequentially delay the data input 1601 in units of one symbol (1.0 Ts). The multiplying circuits 1611 to 1615 weigh the inputted original data and an output data of each of the delay circuits 1608 to 1610 by multiplying them by predetermined coefficients $c_0$ to $c_n$. The adding circuit 1616 adds output data of the multiplying circuits 1611 to 1615 and then transmits the obtained data to the transmission medium 1603. As a result, the transmission side equalizing circuit 1602 functions as a symbol rate FIR (Finite duration Impulse Response) filter for the data input 1601.

Here, it is assumed that the transfer function of the transmission medium 1603 is $C(\omega)$, the transfer function of a combination of the transmission side equalizing circuit 1602 and the reception side equalizing circuit 1604 is $E(\omega)$, and the transfer function of the entire partial response transmission system is $G(\omega)$. In this case, the following relation (1) is met:

$$C(\omega)*E(\omega)=G(\omega) \tag{1}$$

In the partial response transmission system shown in FIG. 16, the characteristic of the transmission side equalize circuit 1602 is specified based on the coefficients $c_0$ to $c_n$, and the transfer function $E(\omega)$ is adjusted for the transfer function $G(\omega)$ of the entire system to have a desired value.

FIG. 17 is a graph showing an ideal relationship between the transfer function $C(\omega)$ of the transmission medium and the transfer function $G(\omega)$ of the entire system in the duobinary method. Since this relationship is an example of the duobinary method, the transfer function $G(\omega)$ of the entire system is $1+z^{-1}$. This transfer function $G(\omega)$ in the duobinary transmission has a characteristic of a fan-like form such that the gain becomes zero at a Nyquist frequency $f_{nyq}$. The transfer function $C(\omega)$ of the transmission medium becomes close to zero in a high frequency band due to attenuation caused by skin effect or dielectric loss.

If the maximum gain of the transfer function $E(\omega)$ for the combination of the transmission side equalizing circuit 1602 and the reception side equalizing circuit 1604 is normalized to "1", as shown in FIG. 17, the transfer function $G(\omega)$ of the entire system has a curve to make contact with the inner side of the transfer function $C(\omega)$ of the transmission medium. In FIG. 17, the gain in the Nyquist transmission is also shown for comparison.

With the configuration as described above, the conventional partial response transmission system transmits data at high speed while accepting intersymbol interference. However, in the system shown in FIG. 16, the output amplitude of the equalizing circuit decreases due to a limitation depending on the frequency characteristic of the equalizing circuit, resulting in great decrease in the level of the partial response signal 1605. The reasons for this problem will be described below.

A frequency characteristic $E_{symb}(\omega)$ of the symbol rate FIR filter such as the transmission side equalizing circuit 1602 can be expressed by the following equation (2):

$$E_{symb}(\omega)=\Sigma c_n e^{-j\omega nT_s} \tag{2}$$

Now, the maximum value of the gain is normalized by using the following equation (3):

$$\Sigma|c_n|=1 \tag{3}$$

As can be seen from FIG. 17, in the partial response transmission, the frequency at which the gain of $E_{sym}(\omega)$ becomes maximum, that is, the frequency at which the transfer function $C(\omega)$ of the transmission medium and the transfer function $G(\omega)$ of the entire system approach closest to each other, is lower than the Nyquist frequency. Now, paying attention to the gain at ⅔ frequency of the Nyquist frequency, for example, the gain always becomes smaller than "1", as shown in the following equation (4):

$$|E_{symb}(\omega)| = \left|\sum c_n e^{-j\left(\frac{2\pi}{3T_s}\right)nT}\right| = \left|\sum c_n e^{-j\frac{2}{3}n\pi}\right| < \sum |c_n| = 1 \quad (4)$$

From this, it could be understood that the entire available frequency band of the transmission medium is not yet used. FIG. 18 is a graph showing an actual relationship between the transfer function $C(\omega)$ of the transmission medium and the transfer function $G(\omega)$ of the entire system in the conventional system adopting the duobinary method. In the conventional system, the signal amplitude is decreased by the equalizing circuit, and thus the graph of the actual relationship with the transfer function $G(\omega)$ of the entire system is different from that of the ideal relationship of FIG. 17, as shown in FIG. 18. As a result, the deciding circuit 1606 can no longer judge a slight potential difference, thus resulting in a failure to accurately transmit data in some cases.

In conjunction with the above description, a signal generating unit is disclosed in Japanese Laid Open Patent Application (JP-A-Heisei 8-110370). In this conventional example, an output signal is transmitted from a signal generator in synchronization with a clock signal outputted from a clock signal generator. A digital delay circuit delays the transmission signal from the signal generator for a period equivalent to a predetermined number times of a period of the clock signal. A first amplifier 4 amplifies the delayed signal. A second amplifier sets a rate of a level of the amplified signal and a level of the transmission signal to a predetermined value. A differential amplifier determines a difference between the level of the delayed signal and the level of the transmission signal to a predetermined value. An output signal of the differential amplifier is outputted through a low-pass filter whose cut-off frequency is set to a frequency corresponding to a frequency of the clock signal.

Also, an adaptive equalizer is disclosed in Japanese Laid Open Patent Application (JP-A-Heisei 9-321671). In the adaptive equalizer of this conventional example, in order to reduce a circuit scale while maintaining a high data transmission efficiency, adaptive signal processing is carried out to an input digital signal passed through a transmission path to minimize an equalization error. A variable coefficient filter carries out a filtering process on the input digital signal based on preset coefficients. An error detection system detects an equalization error. A coefficient control unit controls the coefficients based on the equalization error. The coefficient control unit includes a deciding circuit to decide whether or not an absolute value of each sample value of the input digital signal is larger than a predetermined value. A coefficient generating section generates the coefficients based on values obtained by giving a polarity according to the polarity of the sample value to the equalization error, when it is decided that the absolute value is larger than with the predetermined value.

Also, a communication system is disclosed in Japanese Laid Open Patent Application (JP-P2003-204291A). In this conventional example, a transmission signal is generated in a semiconductor integrated circuit and supplied to a transmission circuit (equalization circuit) in the semiconductor integrated circuit. A buffering signal obtained by buffering the transmission signal by a buffer and a 1-bit delayed signal obtained by delaying the transmission signal by one bit and inverting the delayed signal are added in a predetermined rate and the addition resultant signal is outputted onto a transmission path. The addition resultant signal transmitted on the transmission path is equalized by an equalization circuit in another semiconductor integrated circuit, and then supplied to a signal decision circuit, which converts it to a digital signal. Thus, by providing the equalization circuit in both of the transmission side and the reception side, the frequency dependence of attenuation of the signal received by the other semiconductor integrated circuit can be made small and an amplification factor of a high frequency component can be reduced in the equalization circuit of the reception side.

SUMMARY OF THE INVENTION

It is an object of the present invention to provide a partial response transmission system with an equalizer, in which decrease in the signal amplitude in an equalizing circuit is suppressed.

In an aspect of the present invention, a partial response transmission system in which a data signal is transmitted from a transmission side to a reception side through a transmission medium, includes an equalizing circuit provided in the transmission side or the reception side, and configured to adjust a transfer function for an entire system including the transmission medium to a desired transfer function by delaying input data over a plurality of states in units of a period equal to a transition time of a single bit response by the desired transfer function of a partial response transmission and by weighing and adding data in the plurality of stages; and a deciding circuit provided in the reception side and configured to decide an output data from a signal received through the transmission medium through processing under consideration of the desired transfer function.

Here, the equalizing circuit may be provided in the transmission side to equalize a signal for the input data to be transmitted to the transmission medium.

Also, the equalizing circuit may be provided in the reception side to equalize the signal received through the transmission medium.

Also, the equalizing circuit may be a decision feed back equalizing circuit comprising the equalizing circuit which equalizes the data output signal to output the equalized signal to the adder as the addition input signal.

Also, in the equalizing circuit, a circuit which delays the input data over the plurality of states in units of a period equal to the transition time of the single bit response by the desired transfer function of the partial response transmission and weighs and adds data in the plurality of stages is constituted from an oversampled FIR filter having a rate of a plural times of symbol rate.

In this case, the oversampled FIR filter includes a delay circuit configured to delay the input data over the plurality of stages at the rate of the plural times of symbol rate; and a weighing and adding circuit configured to weigh the data in the plurality of stages delayed by the delay circuit and to add the weighed data.

Also, the oversampled FIR filter includes a plurality of symbol rate FIR filters, each of which delays the input data over the plurality of stages at the symbol rate, weighs the data in the plurality of stages delayed by the delay circuit, and adds the weighed data, and the plurality of symbol rate FIR filters operate in parallel.

Also, the equalizing circuit may include a plurality of variable output buffers, each of which amplifies a signal for the input data based on a predetermined coefficient and current- or voltage-adds the amplified signals.

Also, the desired transfer function may be expressed as $1+z^{-1}$, and the transition time of the single bit response may be equivalent to tap spacing of 1.5 symbols.

In another aspect of the present invention, an equalizing circuit provided in a transmission side or a reception side in a partial response transmission, includes a delay section configured to delay input data over a plurality of states in units of a period equal to a transition time of a single bit response by a desired transfer function in the partial response transmission; and a weighing and adding section configured to adjust a transfer function for an entire system including a transmission medium to the desired transfer function by weighing and adding data delayed in the plurality of stages.

Here, the delay section and the weighing and adding section may be constituted from an oversampled FIR filter having a rate of a plural times of symbol rate.

In this case, the oversampled FIR filter may include a delay circuit configured to delay the input data over the plurality of stages at the rate of the plural times of symbol rate; and a weighing and adding circuit configured to weigh the data in the plurality of stages delayed by the delay circuit and to add the weighed data.

Also, the oversampled FIR filter may include a plurality of symbol rate FIR filters, each of which delays the input data over the plurality of stages at the symbol rate, weighs the data in the plurality of stages delayed by the delay circuit, and adds the weighed data, and the plurality of symbol rate FIR filters operate in parallel.

Also, the equalizing circuit may include a plurality of variable output buffers, each of which amplifies a signal for the input data based on a predetermined coefficient and current- or voltage-adds the amplified signals.

Also, the desired transfer function may be expressed as $1+z^{-1}$, and the transition time of the single bit response may be equivalent to tap spacing of 1.5 symbols.

DESCRIPTION OF THE PREFERRED EMBODIMENTS

Hereinafter, a partial response transmission according to the present invention will be described in detail with reference to the attached drawings.

Figure 1:
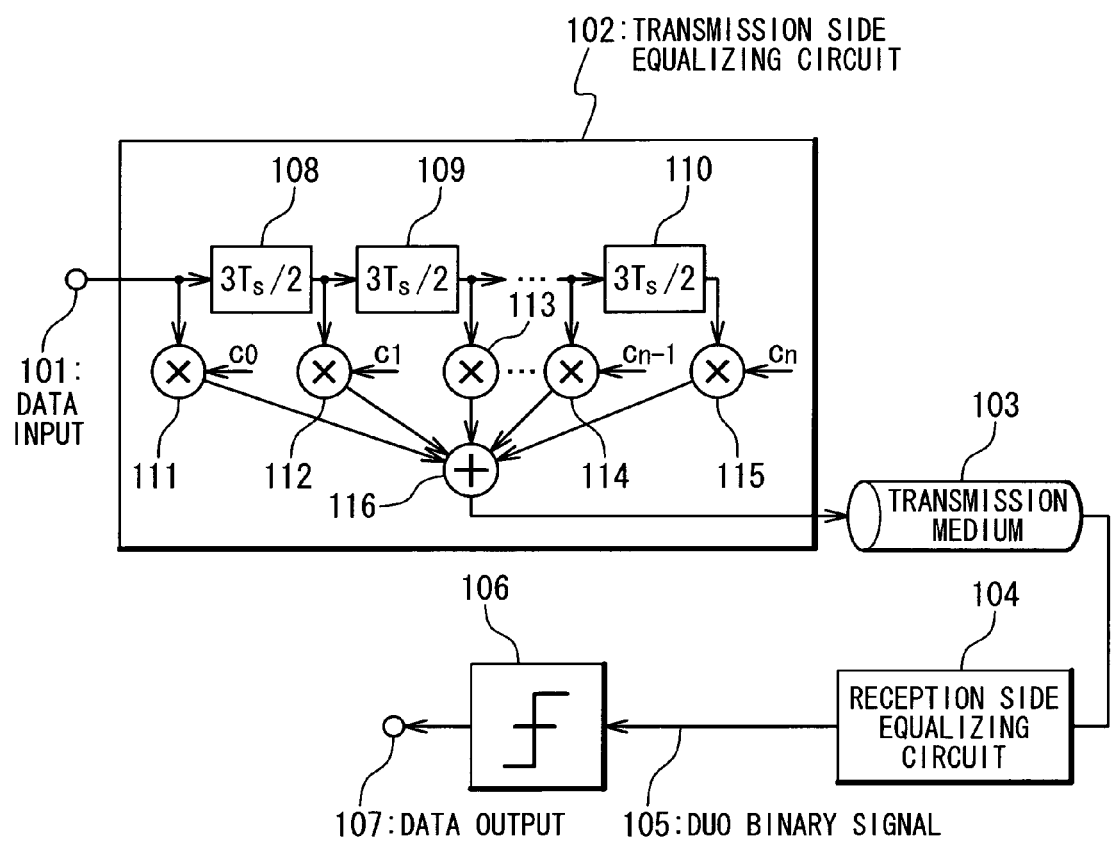
FIG. 1 is a block diagram showing the configuration of a partial response transmission system according to a first embodiment of the present invention.

FIG. 1 is a block diagram showing the configuration of the partial response transmission system according to the first embodiment of the present invention. Referring to FIG. 1, the partial response transmission system is provided with a transmission side equalizing circuit 102, a transmission medium 103, a reception side equalizing circuit 104, and a deciding circuit 106. The transmission side equalizing circuit 102 equalizes an inputted original data 101 and then transmits a signal of the equalized data to the transmission medium 103. The signal is attenuated during the transfer on the transmission medium 103 and is received as a weak signal including intersymbol interference by the reception side equalizing circuit 104. The reception side equalizing circuit 104 equalizes the signal received through the transmission medium 103 and then transmits as a partial response signal 105 to the deciding circuit 106. The deciding circuit 106 decides data based on the partial response signal 105 received from the reception side equalizing circuit 104, by performing processing such as logical processing in which a desired transfer function used for the partial response transmission is taken into consideration, and then outputs the determination result as a data output 107.

Figure 16:
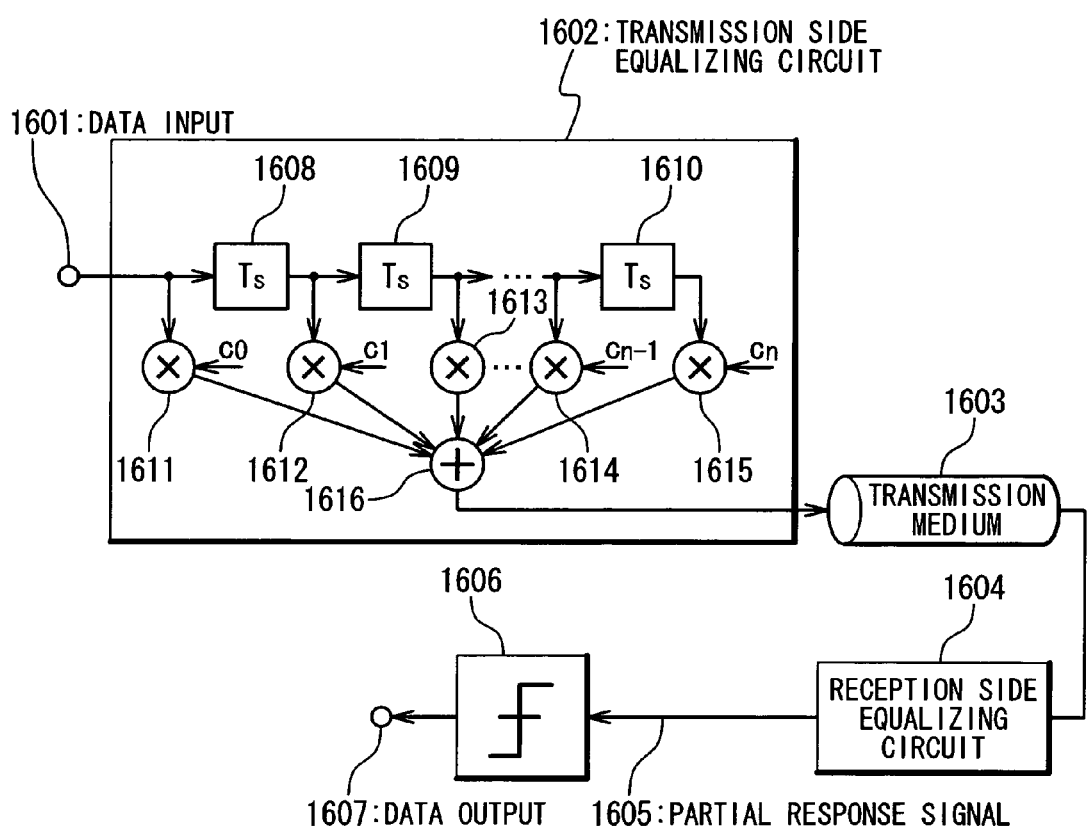
FIG. 16 is a block diagram showing the configuration of a conventional partial response transmission system.
Figure 17:
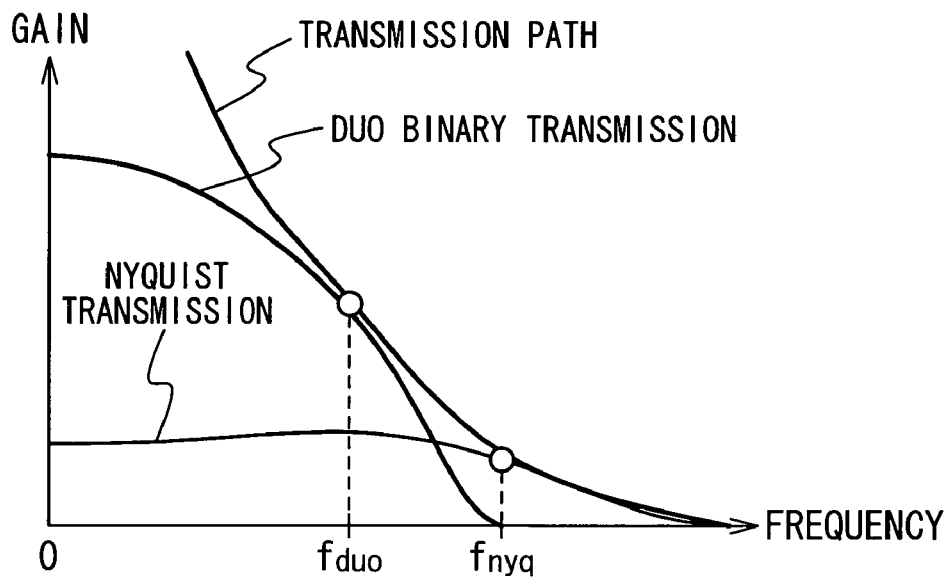
FIG. 17 is a graph showing an ideal relationship between a transfer function $C(\omega)$ of a transmission medium and a transfer function $G(\omega)$ of an entire system in the duobinary method.
Figure 18:
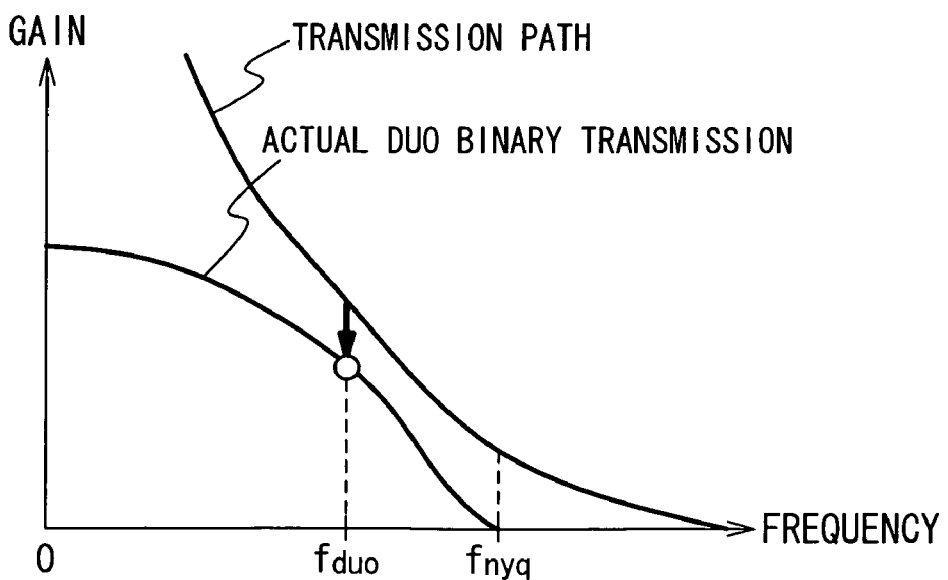
FIG. 18 is a graph showing an actual relationship between the transfer function $C(\omega)$ of the transmission medium and the transfer function $G(\omega)$ of the entire system in a conventional system adopting the duobinary method.

The transmission side equalizing circuit 102 is provided with delay circuits 108 to 110, multiplying circuits 111 to 115, and an adding circuit 116. The delay circuits 108 to 110 are connected in series, to sequentially delay the data input 101 in units of tap spacing of 1.5 symbols (1.5 Ts). The system in this embodiment differs from the conventional system of FIG. 16 in that the unit of delay is tap spacing of 1.5 symbols. The multiplying circuits 111 to 115 weigh the input data and an output data of each of the delay circuits 108 to 110 by multiplying them by predetermined coefficients $c_0$ to $c_n$. The adding circuit 116 adds output data of the multiplying circuits 111 to 115 and transmits the obtained data to the transmission medium 103.

Figure 2:
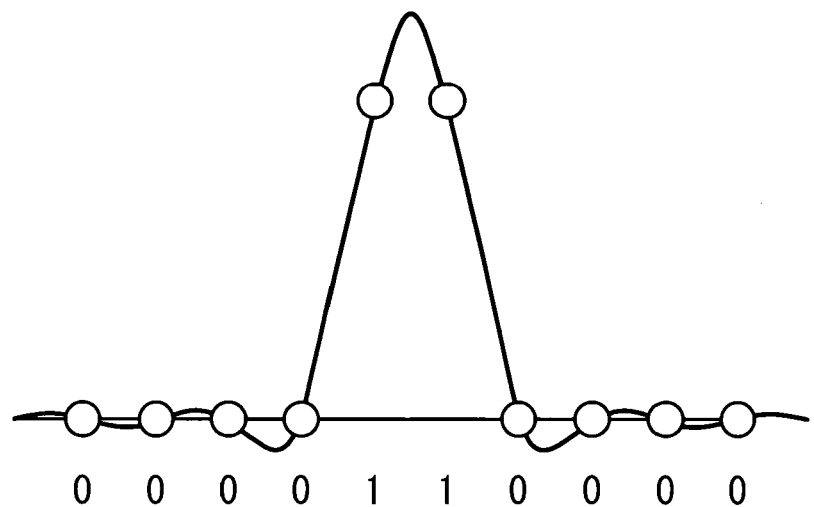
FIG. 2 is a graph showing the waveform of an ideal single bit response provided by duobinary transmission.

FIG. 2 is a graph showing the ideal waveform of a single bit response provided in duobinary transmission. In the duobinary transmission, since the transfer function is $1+z^{-1}$, data immediately before current data by one bit is added to the current data due to intersymbol interference. Thus, a response outputted for a serial single bit input "0 . . . 010 . . . 0" is "0 . . . 0110 . . . 0" as shown in FIG. 2. In an equalizing circuit of a conventional system, equalization is carried out at the symbol rate of 1.0 symbol, and this case corresponds to white circles shown in FIG. 2.

Figure 3:
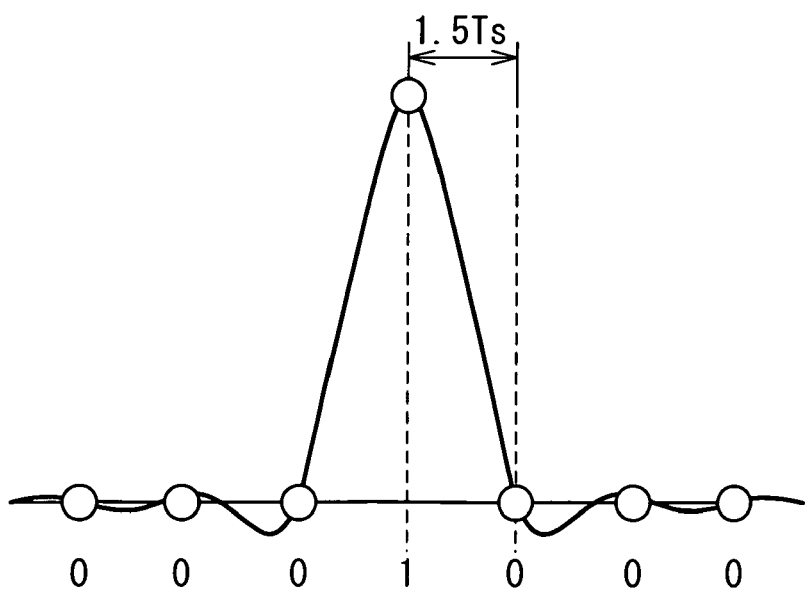
FIG. 3 is a graph showing a relationship between the waveform of the single bit response provided by the duobinary transmission and a tap spacing of 1.5 symbols.

FIG. 3 is a graph showing a relationship between the waveform of a single bit response provided in the duobinary transmission and the symbol rate of 1.5 symbols. In the present embodiment, the duobinary transmission is approximated to a pseudo Nyquist transmission having the symbol interval of 1.5 Ts which is equivalent to the transition time of the waveform of a single bit response provided in the duobinary transmission. This transmission is hereinafter referred to as "pseudo Nyquist transmission".

The transmission side equalizing circuit 102 in the present embodiment carries out equalization by functioning as a 1.5 times oversampled FIR filter in which the gain becomes maximum at a Nyquist frequency in the pseudo Nyquist transmission (hereinafter to be referred to as "pseudo Nyquist frequency"). The frequency characteristic of the transmission side equalizing circuit 102 is expressed by the following equation (5):

$$E_{duo}(\omega) = \Sigma c_n e^{-j\omega n(1.5T_s)} \quad (5)$$

The pseudo Nyquist frequency is expressed by the following equation (6):

$$\omega_{duo} = \frac{\pi}{1.5T_s} \quad (6)$$

Therefore, based on the equations (5) and (6), the gain of the transmission side equalizing circuit 102 at the pseudo Nyquist frequency $\omega_{duo}$ is as expressed by the following equation (7):

$$|E_{duo}(\omega_{duo})| = \left|\sum c_n e^{-j\left(\frac{\pi}{1.5T_s}\right)n(1.5T_s)}\right| = \left|\sum c_n e^{-jn\pi}\right| \quad (7)$$

Here, by setting the coefficients $c_0$ to $c_n$ of the multiplying circuits 111 to 115 so that the signs of adjacent coefficients become opposite to each other, that is, so that $c_n$ multiplied by $c_{n+1}$ becomes smaller than 0, the gain of the transmission side equalizing circuit 102 at the pseudo Nyquist frequency $\omega_{duo}$ can be set at a maximum as shown by the following equation (8):

$$|E_{duo}(\omega_{duo})| = |\Sigma c_n e^{-jn\pi}| = |\Sigma c_n| \quad (8)$$

Figure 4A:
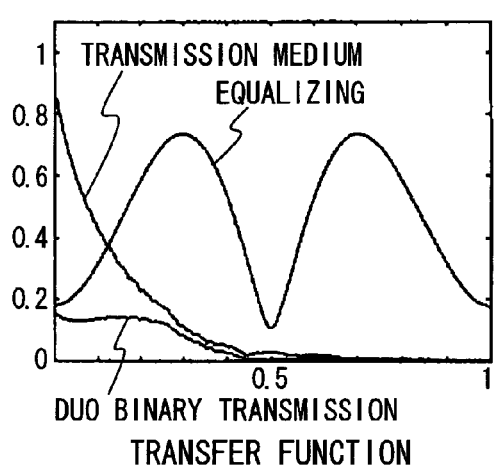
FIGS. 4A and 4B are a graph showing transfer functions and eye openings in conventional duobinary transmission using a symbol rate FIR filter.
Figure 4B:
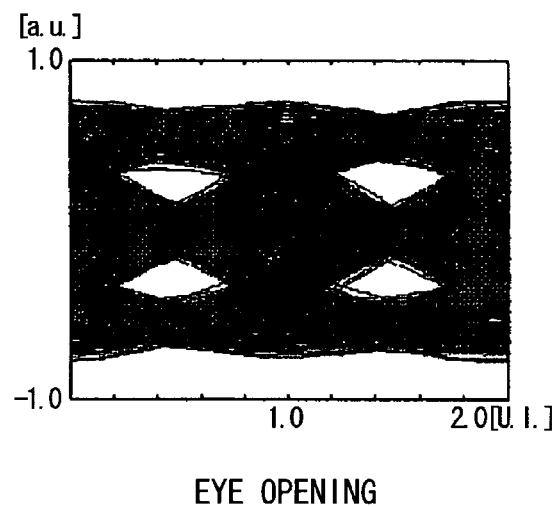

FIGS. 4A and 4B are a graph showing one example of the transfer function and the eye openings in the conventional duobinary transmission employing the symbol rate FIR filter.

Figure 5A:
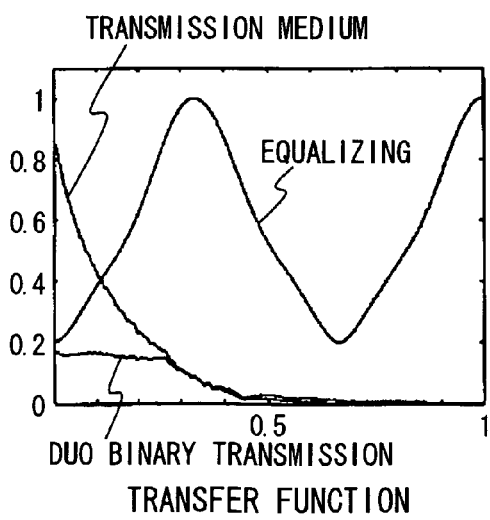
FIGS. 5A and 5B are a graph showing transfer functions and eye openings in duobinary transmission achieved by pseudo Nyquist transmission using a 1.5 times oversampled FIR filter.
Figure 5B:
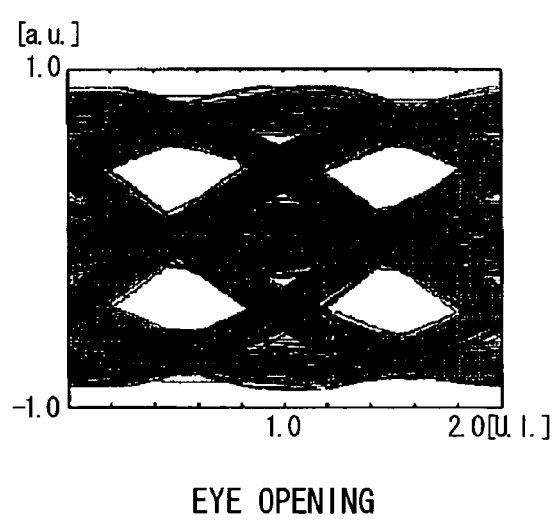

FIGS. 5A and 5B are a graph showing one example of the transfer function and the eye openings in the duobinary transmission achieved by the pseudo Nyquist transmission employing the 1.5 times oversampled FIR filter. In FIGS. 4A and 5A, the horizontal axes for the transfer function are normalized based on the symbol rate. As shown in FIG. 4A, in the conventional duobinary transmission, the maximum gain of the equalizing circuit is limited to approximately 0.7, and thus the eye openings are small as shown in FIG. 4B. On contrast, in the duobinary transmission of this embodiment, the gain of the equalizing circuit becomes "1" at the pseudo Nyquist frequency $\omega_{duo}$, and the frequency band of the transmission medium is efficiently utilized as shown in FIG. 5A. Thus, the eye openings of this embodiment are improved better than those in the conventional duobinary transmission, as shown in FIG. 5B.

As described above, in the transmission side equalizing circuit 102 according to the present embodiment, the input original data 101 is delayed by the delay circuits 108 to 110 in units of tap spacing of 1.5 symbols which is equivalent to the transition time of the waveform of a single bit response in the duobinary transmission, and the delayed data are weighed by the multiplying circuits 111 to 115, and added by the adding circuit 116. Thus, decrease in the signal amplitude in the transmission side equalizing circuit 102 can be suppressed, permitting accurate data determination to be performed on the deciding circuit 106.

Figure 6:
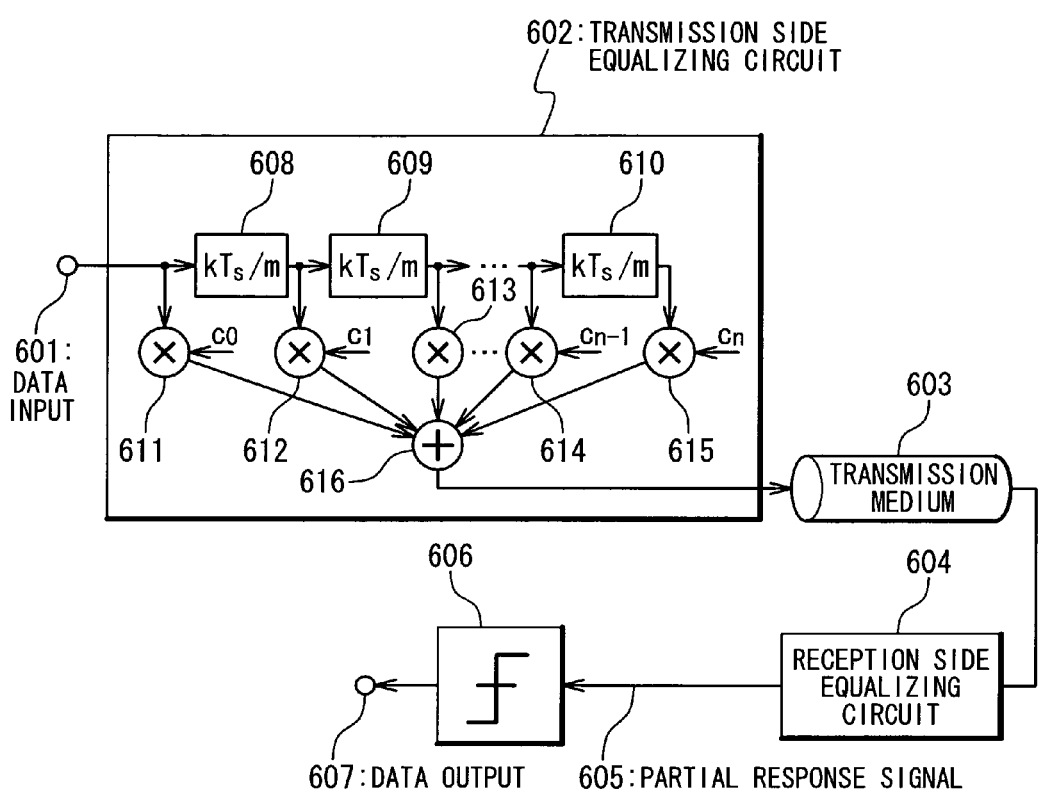
FIG. 6 is a block diagram showing the configuration of the partial response transmission system according to a second embodiment of the present invention.

Next, the partial response transmission according to the second embodiment of the present invention will be described. FIG. 6 is a block diagram showing the configuration of the partial response transmission system according to the second embodiment of the present invention.

Referring to FIG. 6, the partial response transmission system is provided with a transmission side equalizing circuit 602, a transmission medium 603, a reception side equalizing circuit 604, and a deciding circuit 606. The transmission side equalizing circuit 602 equalizes an input original data 601 to transmit an equalized signal to the transmission medium 603. The signal is attenuated largely during transfer on the transmission medium 603 and then is received as a weak signal including intersymbol interference by the reception side equalizing circuit 604. The reception side equalizing circuit 604 equalizes the signal received from the transmission medium 603 and then transmits as a partial response signal 605 to the deciding circuit 606. The deciding circuit 606 determines data based on the partial response signal 605 received from the reception side equalizing circuit 604 and then outputs the determination result as an output data 607.

The transmission side equalizing circuit 602 is provided with delay circuits 608 to 610, multiplying circuits 611 to 615, and an adding circuit 616. The delay circuits 608 to 610 are connected in series, and each of them sequentially delays the input data 601 in units of tap spacing of k/m symbols (kTs/m, where k and m denote integer numbers, and k is larger than m). This embodiment differs from the first embodiment in that the unit of delay is the tape spacing of k/m symbols. The multiplying circuits 611 to 615 weigh the input data and output data of the delay circuits 608 to 610 by multiplying them by predetermined coefficients $c_0$ to $c_n$. The adding circuit 616 adds output data of the multiplying circuits 611 to 615 and then transmits the obtained data to the transmission medium 603.

Figure 7:
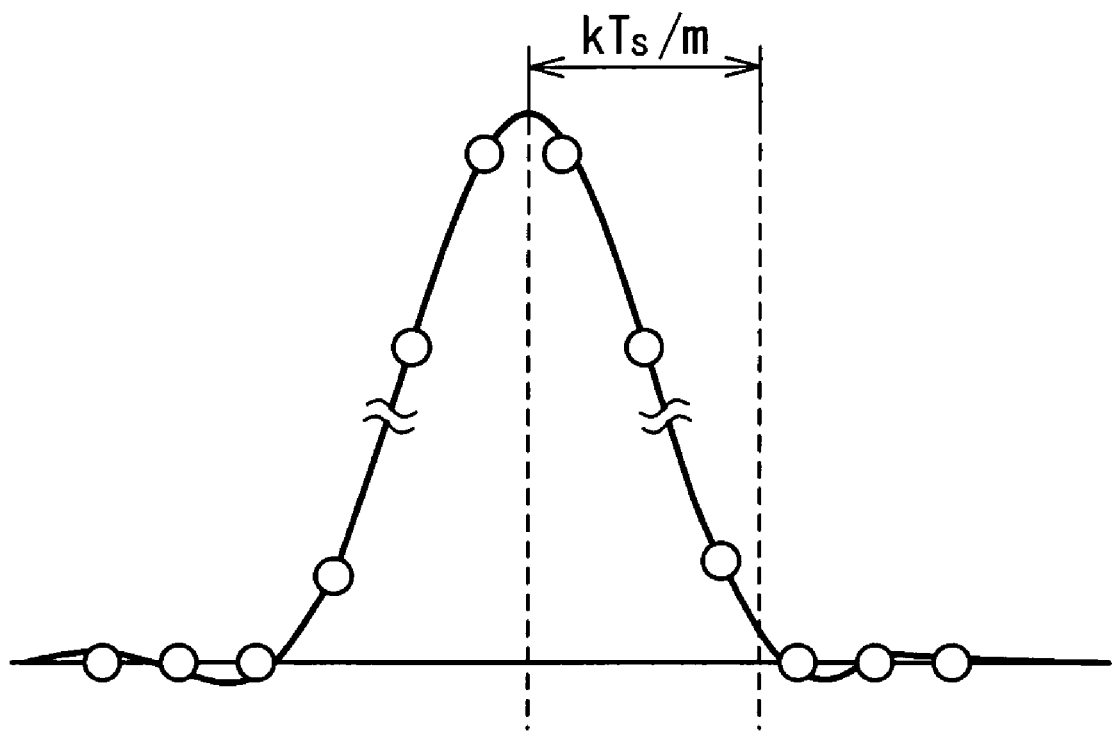
FIG. 7 is a graph showing the waveform of an ideal single bit response provided by typical partial response transmission.

FIG. 7 is a graph showing an ideal waveform of a single bit response provided in the typical partial response transmission. As shown in FIG. 7, the rising time of the ideal single bit response provided in the partial response transmission becomes kTs/m. The transmission side equalizing circuit 602 in this embodiment carries out equalization by functioning as a k/m times FIR filter.

The pseudo Nyquist frequency $\omega_{PR}$ in this case is expressed by the following equation (9):

$$\omega_{PR} = \frac{m\pi}{kT_s} \qquad (9)$$

The partial response signal 605 can be maximized by maximizing the gain at the pseudo Nyquist frequency $\omega_{PR}$ as shown by the following equation (10):

$$\begin{aligned} |E_{frac}(\omega_{PR})| &= \left|\sum c_n e^{-j\omega_{PR} n \frac{kT_s}{m}}\right| \qquad (10)\\ &= \left|\sum c_n e^{-j\left(\frac{\pi}{kT_s}\right)n\left(\frac{kT_s}{m}\right)}\right|\\ &= \sum |c_n e^{-jn\pi}|\\ &= \sum |c_n|\\ &= 1 \end{aligned}$$

As described above, in the transmission side equalizing circuit 602 according to the present embodiment, the input data 601 is delayed by the delay circuits 608 to 610 in units of k/m times of one symbol which is equivalent to the transition time of the waveform of a single bit response in the partial response transmission, and the delayed data are weighed by the multiplying circuits 611 to 615, and then added by the adding circuit 616. Thus, decrease in the signal amplitude in the transmission side equalizing circuit 602 can be suppressed, thus permitting accurate data decision to be performed in the deciding circuit 606.

Figure 8:
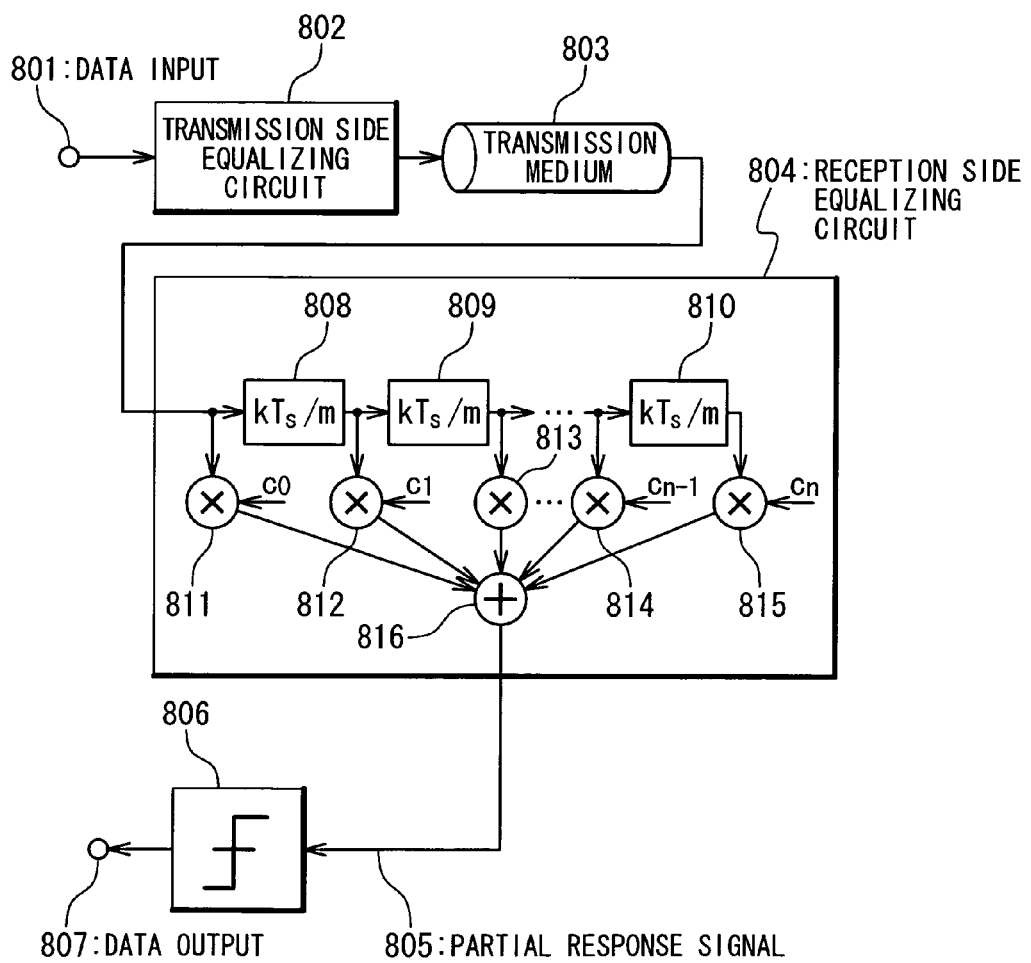
FIG. 8 is a block diagram showing the configuration of the partial response transmission system according to a third embodiment of the present invention.

Next, the partial response transmission according to the third embodiment of the present invention will be described. FIG. 8 is a block diagram showing the configuration of the partial response transmission system according to the third embodiment of the present invention.

Referring to FIG. 8, the partial response transmission system is provided with a transmission side equalizing circuit 802, a transmission medium 803, a reception side equalizing circuit 804, and a deciding circuit 806. The transmission side equalizing circuit 802 equalizes a data input 801 to transmit to the transmission medium 803. The signal is attenuated largely during transfer on the transmission medium 803 and then is received as a weak signal including intersymbol interference by the reception side equalizing circuit 804. The reception side equalizing circuit 804 equalizes the signal transmitted from the transmission medium 803 and then transmits it as a partial response signal 805 to the deciding circuit 806. The deciding circuit 806 decides data based on the partial response signal 805 received from the reception side equalizing circuit 804 and then outputs the decision result as a data output 807. The present embodiment differs from the second embodiment in that a k/m times FIR filter is used for the reception side equalizing circuit 804.

The reception side equalizing circuit 804 is provided with delay circuits 808 to 810, multiplying circuits 811 to 815, and an adding circuit 816. The delay circuits 808 to 810 are connected in series, and sequentially delay data transmitted from the transmission medium 803 in units of k/m times of one symbol (kTs/m, where k and m denote integer numbers, and k is larger than m). The multiplying circuits 811 to 815 weigh the input data and output data of the delay circuits 808 to 810 by multiplying them by predetermined coefficients $c_0$ to $c_n$. The adding circuit 816 adds output data of the multiplying circuits 811 to 815 and then transmits the obtained data as a partial response signal 805 to the deciding circuit 806.

In this way, according to the present embodiment, a decrease in the signal amplitude in the reception side equalizing circuit 804 can be suppressed, thus permitting accurate data determination to be performed on the deciding circuit 806.

Figure 9:
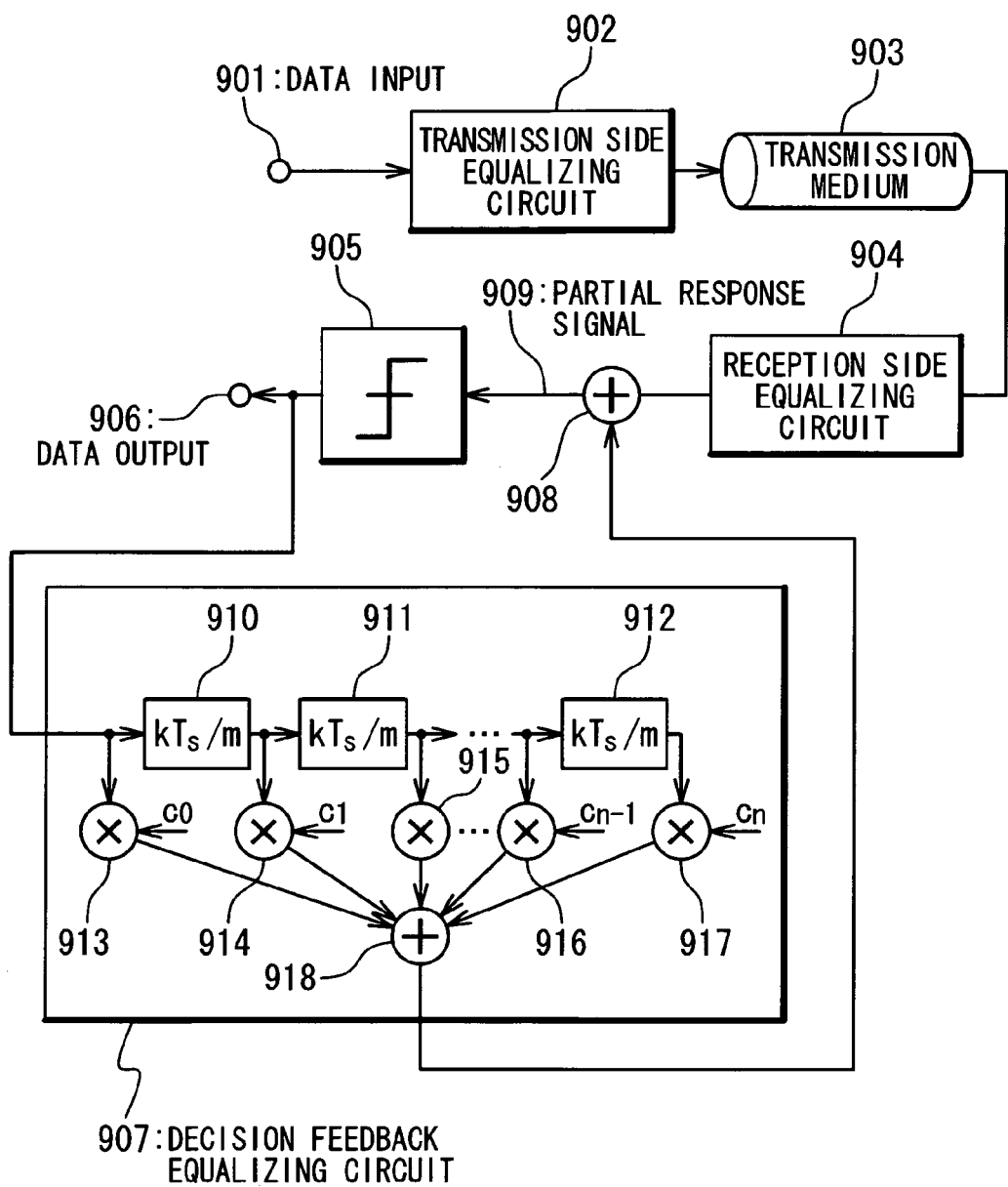
FIG. 9 is a block diagram showing the configuration of the partial response transmission system according to a fourth embodiment of the present invention.

Next, the partial response transmission according to the fourth embodiment of the present invention will be described. FIG. 9 is a block diagram showing the configuration of the partial response transmission system according to the fourth embodiment of the present invention. In this embodiment, a partial response transmission system uses a decision feedback type equalizing circuit. For the decision feedback type equalizing circuit, a k/m times oversampled FIR filter is used.

Referring to FIG. 9, the partial response transmission system is provided with a transmission side equalizing circuit 902, a transmission medium 903, a reception side equalizing circuit 904, a deciding circuit 905, a decision feedback type equalizing circuit 907, and an adding circuit 908. The transmission side equalizing circuit 902 equalizes an input data 901 and then transmits to the transmission medium 903. The signal is attenuated largely during the transfer through the transmission medium 903 and then is received as a weak signal including intersymbol interference by the reception side equalizing circuit 904. The reception side equalizing circuit 904 equalizes the signal received from the transmission medium 903 and then transmits to the adding circuit 908. The adding circuit 908 adds data received from the reception side equalizing circuit 904 and data received from the decision feedback type equalizing circuit 907, and then transmits the obtained data as a partial response signal 909 to the deciding circuit 905. The deciding circuit 905 decides data based on the partial response signal 909 transmitted from the adding circuit 908 and then outputs the decision result as a data output 906. The decision feedback type equalizing circuit 907 equalizes the data output 906 transmitted from the deciding circuit 905, and then transmits to the adding circuit 908.

The decision feedback type equalizing circuit 907 is provided with delay circuits 910 to 912, multiplying circuits 913 to 917, and an adding circuit 918. The delay circuits 910 to 912 are connected in series, and sequentially delay data output in units of k/m times of one symbol (kTs/m, where k and m denote integer numbers, and k is larger than m). The multiplying circuits 913 to 917 weigh the input data and output data of the delay circuits 910 to 912 by multiplying them by predetermined coefficients $c_0$ to $c_n$. The adding circuit 918 adds output data of the multiplying circuits 913 to 917, and then feedbacks the obtained data to the adding circuit 908.

In this way, according to the present embodiment, in the partial response transmission system using the decision feedback type equalizing circuit, a decrease in the signal amplitude in the decision feedback type equalizing circuit 907 can be suppressed, thus permitting accurate data decision to be performed on the deciding circuit 905.

The 1.5 times oversampled FIR filter in the system of the first embodiment described above can be formed from a doubly oversampled FIR filter.

Figure 10:
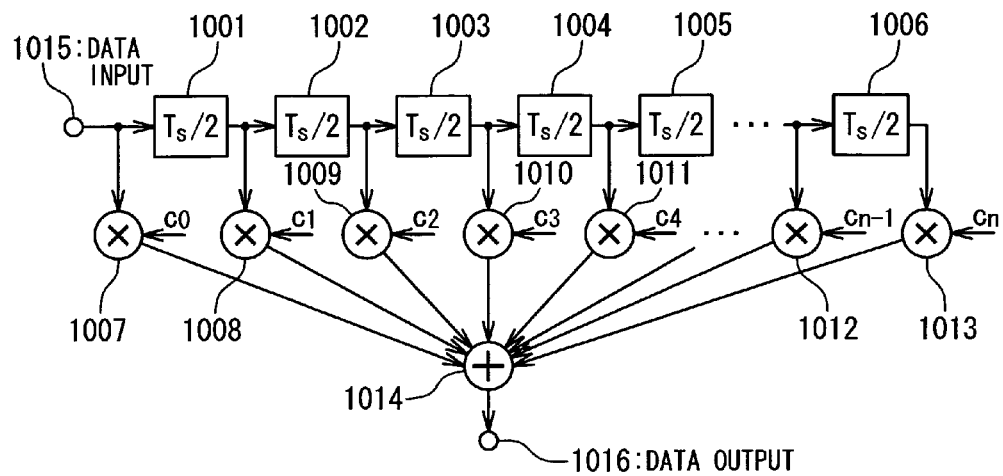
FIG. 10 is a block diagram showing the configuration of an equalizing circuit using the 1.5 times oversampled FIR filter formed with a doubly oversampled FIR filter.

FIG. 10 is a block diagram showing the configuration of the equalizing circuit using the 1.5 times oversampled FIR filter formed from the doubly oversampled FIR filter. Referring to FIG. 10, the equalizing circuit is provided with delay circuits 1001 to 1006, multiplying circuits 1007 to 1013, and an adding circuit 1014. The delay circuits 1001 to 1006 are connected in series, and sequentially delay a data input 1015 in units of tap spacing of ½ symbols (0.5 Ts). The multiplying circuits 1007 to 1013 weigh the input data and output data of the delay circuits 1001 to 1006 by multiplying them by predetermined coefficients $c_0$ to $c_n$. The adding circuit 1014 adds data transmitted from the multiplying circuits 1007 to 1013, and then outputs it as a data output 1016.

The frequency characteristic of the doubly oversampled equalizer is expressed by the following equation (11):

$$E_{os}(\omega) = \sum c_n e^{-j\omega n\left(\frac{T_s}{2}\right)} \quad (11)$$

In the frequency characteristic expressed by the equation (11), the gain at the pseudo Nyquist frequency $\omega_{duo}$ indicated by the above equation (6) can be expressed by the following equation (12):

$$|E_{os}(\omega_{duo})| = \left|\sum c_n e^{-j\left(\frac{\pi}{1.5T_s}\right)n\left(\frac{T_s}{2}\right)}\right| = \left|\sum c_n e^{-j\frac{n}{3}\pi}\right| \quad (12)$$

Therefore, by setting the coefficients $c_0$ to $c_n$ of the multiplying circuits 1007 to 1013 under the condition of the following equation (13), the gain at the pseudo Nyquist frequency becomes maximum as shown by the following equation (14):

$$c_n \times c_{n+1} < 0 \quad \begin{cases} c_n = const. & (n = 3i) \\ c_n = 0 & (n \neq 3i) \end{cases} (i = 0,1,2,3,\ldots) \quad (13)$$

$$|E_{os}(\omega_{duo})| = \left|\sum c_n e^{-j\frac{n}{3}\pi}\right| \quad (14)$$
$$= \left|\sum c_{3i} e^{-j\left(\frac{3i}{3}\right)\pi}\right|$$
$$= \sum |c_{3i} e^{-ji\pi}|$$
$$= \sum |c_{3i}|$$
$$= 1$$

The k/m times oversampled FIR filters used in the systems of the second, third, and fourth embodiments can be each formed from an m times oversampled FIR filter.

Figure 11:
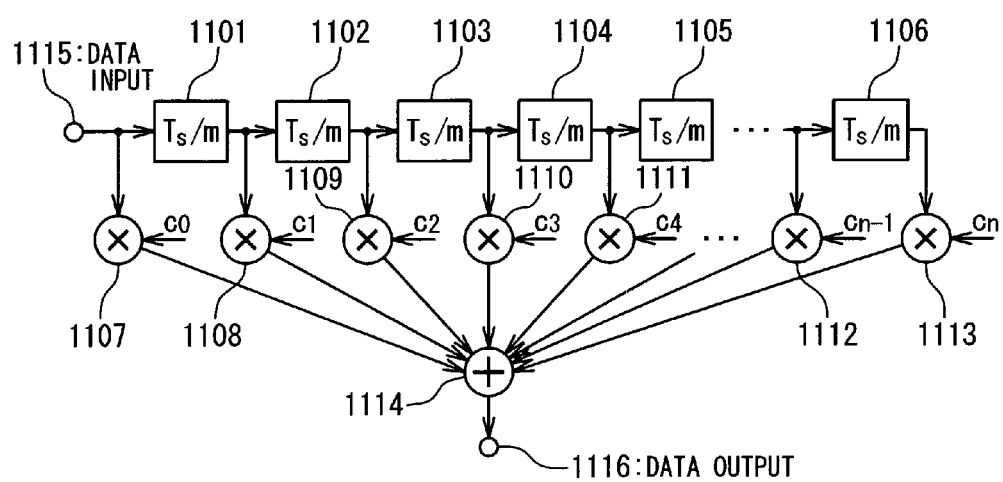
FIG. 11 is a block diagram showing the configuration of an equalizing circuit employing a k/m times FIR filter formed from an m times oversampled FIR filter.

FIG. 11 is a block diagram showing the configuration of an equalizing circuit employing a k/m times FIR filter formed from the m times oversampled FIR filter. Referring to FIG. 11, the equalizing circuit is provided with delay circuits 1101 to 1106, multiplying circuits 1107 to 1113, and an adding circuit 1114. The delay circuits 1101 to 1106 are connected in series, and each of them sequentially delays a data input 1115 in units of 1/m times of one symbol (Ts/m). The multiplying circuits 1107 to 1113 weigh input or output data of the delay circuits 1101 to 1106 by multiplying them by predetermined coefficients $c_0$ to $c_n$. The adding circuit 1114 adds the data transmitted from the multiplying circuits 1107 to 1113 and then outputs it as a data output 1116.

The frequency characteristic of them times oversampled equalizer as a result of this is expressed by the following equation (15):

$$E_{os}(\omega) = \sum c_n e^{-j\omega n\left(\frac{T-s}{m}\right)} \quad (15)$$

In the frequency characteristic expressed by the equation (15), the gain at the pseudo Nyquist frequency $\omega_{duo}$ indicated by the above equation (9) can be expressed by the following equation (16):

$$|E_{os}(\omega_{PR})| = \left|\sum c_n e^{-j\left(\frac{m\pi}{kT_s}\right)n\left(\frac{T_s}{m}\right)}\right| = \left|\sum c_n e^{-j\frac{n}{k}\pi}\right| \quad (16)$$

Therefore, by setting the coefficients $c_0$ to $c_n$ of the multiplying circuits 1107 to 1113 under the condition of the following equation (17), the gain at the pseudo Nyquist frequency becomes maximum as shown by the following equation (18):

$$c_n \times c_{n+1} < 0 \quad \begin{cases} c_n = const \cdot (n = ki) \\ c_n = 0 (n \neq ki) \end{cases} (i = 0, 1, 2, 3, \ldots) \quad (17)$$

$$|E_{os}(\omega_{duo})| = \left|\sum c_n e^{-j\frac{n}{k}\pi}\right| \quad (18)$$
$$= \left|\sum c_{ki} e^{-j\left(\frac{ki}{k}\right)\pi}\right|$$
$$= \sum |c_{ki} e^{-ji\pi}|$$
$$= \sum |c_{ki}| = 1$$

Figure 12:
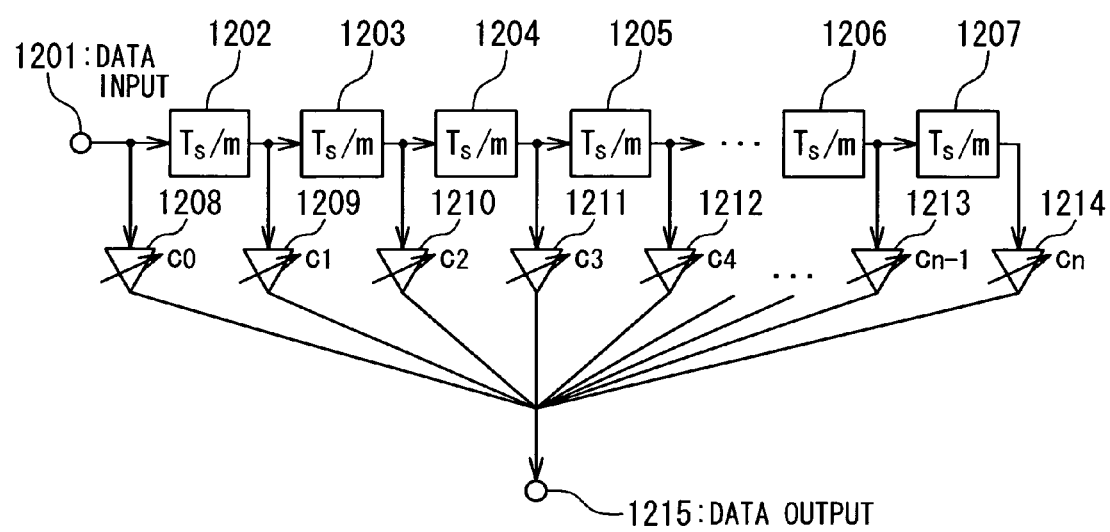
FIG. 12 is a block diagram showing the configuration of an equalizing circuit using the k/m times FIR filter formed from variable output buffers.

The k/m times FIR filters used in the second, third, and fourth embodiments can be each formed from analog current addition or voltage addition using variable output buffers without use of multiplying circuits and adding circuits. FIG. 12 is a block diagram showing the configuration of an equalizing circuit using the k/m times FIR filter formed with variable output buffers.

Referring to FIG. 12, the equalizing circuit is provided with delay circuits 1202 to 1207 and variable output buffers 1208 to 1214. The delay circuits 1202 to 1107 are connected in series, and each of them sequentially delays a data input 1201 in units of tap spacing of 1/m symbols (Ts/m). The variable output buffers 1208 to 1214 amplify input and output data of each stage of the delay circuits 1202 to 1207 in accordance with predetermined coefficients $c_0$ to $c_n$. Outputs of the variable output buffers 1208 to 1214 are commonly connected to a terminal, from which a data output 1215 is outputted.

According to this configuration, the use of multiplying circuits and adding circuits that are difficult to operate at high speed is no longer required, thus permitting a higher-speed system as a whole.

Figure 13:
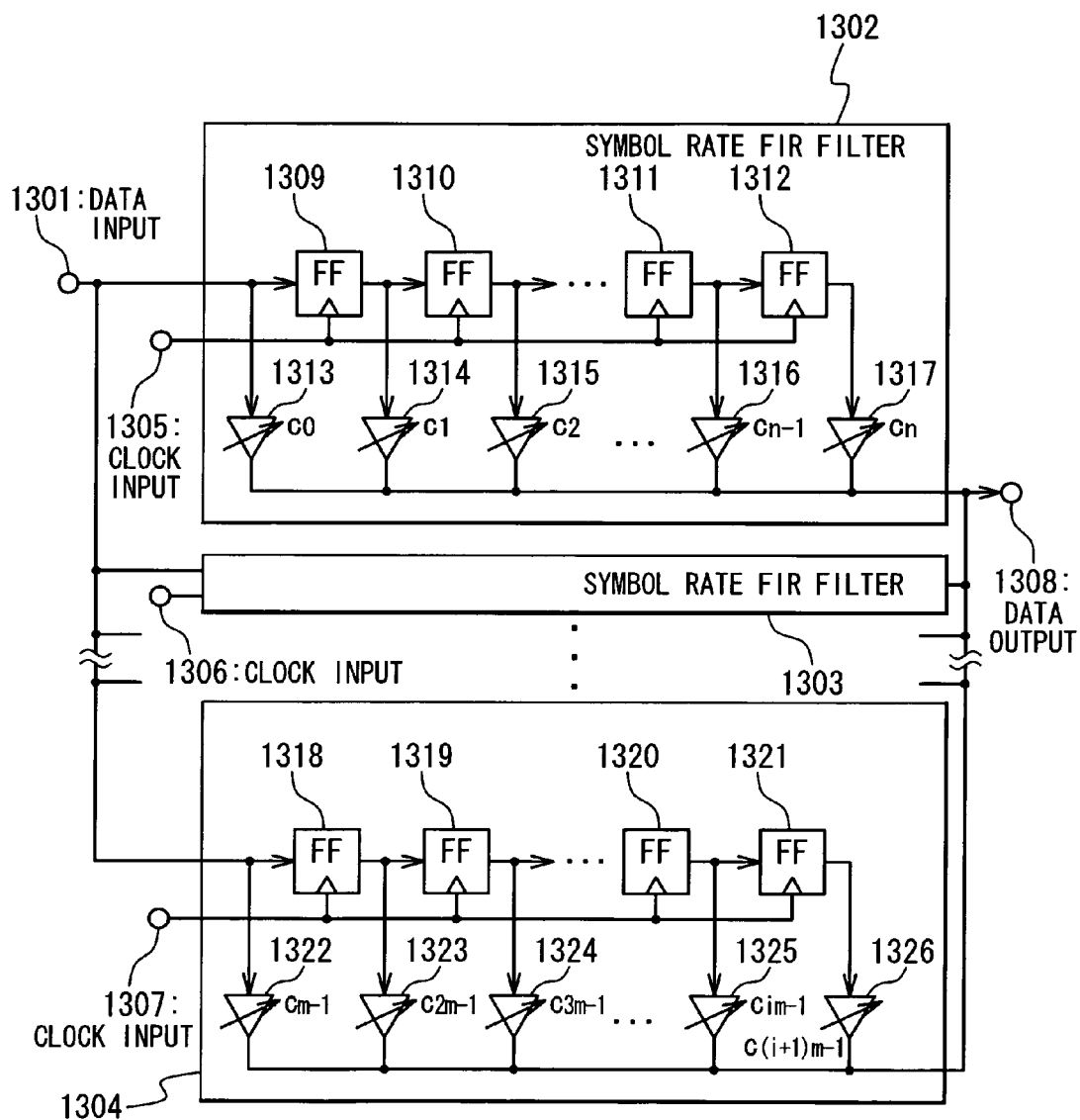
FIG. 13 is a block diagram showing another structure of the equalizing circuit using the k/m times FIR filter formed with the m times oversampled FIR filters.

FIG. 13 is a block diagram showing another configuration of the equalizing circuit employing the k/m times FIR filter formed with the m times oversampled FIR filters. Referring to FIG. 13, the equalizing circuit is provided with the symbol rate FIR filters 1302 to 1304. The symbol rate FIR filters 1302 to 1304 all have the same configuration. The symbol rate FIR filter 1302 is provided with flip-flops 1309 to 1312 and variable output buffers 1313 to 1317. The flip-flops 1309 to 1312 are connected in series, and each of them sequentially shifts a data input 1301 in accordance with a clock input 1305. The variable output buffers 1313 to 1317 amplify input or output data of the flip-flops 1309 to 1312 in accordance with a predetermined coefficient c. Outputs of the variable output buffers 1313 to 1317 are commonly connected together.

Similarly, the symbol rate FIR filter 1304 has flip-flops 1318 to 1321 and variable output buffers 1322 to 1326. The flip-flops 1318 to 1321 are connected in series, and each of them sequentially shifts the data input 1301 in accordance with a clock input 1307. The variable output buffers 1322 to 1326 amplify input or output data of each of the flip-flops 1318 to 1321 in accordance with a predetermined coefficient c. Outputs of the variable output buffers 1322 to 1326 are commonly connected together. Further, outputs of the symbol rate FIR filters 1302 to 1304 are commonly connected to a terminal, and the outputted data is subjected to analog addition to thereby provide a data output 1308.

Here, the transfer function of the m times oversampled FIR filter can be expressed by the following equation (19):

$$\Sigma c_a z^{-n} = \Sigma c_{mi} z^{-mi} + z^{-1} \Sigma c_{mi+1} z^{-mi} + z^{-2} \Sigma c_{mi+2} z^{-mi} \ldots + z^{-(m-1)} \Sigma c_{mi+m-1} z^{-mi} \quad (19)$$

where i is an integer number.

Since $z^{-mi}$ corresponds to a delay of one symbol, the following equation (20):

$$\Sigma c_{mi+1} z^{-mi} (l=0,1,2,\Lambda m-1) \quad (20)$$

provides a symbol rate FIR filter. Therefore, delaying the operation timing (clock inputs 1305 to 1307) for the first filter of the symbol rate FIR filters 1302 to 1304 by a period corresponding to $z^{-1}$ and adding the outputs of the number of symbol rate FIR filters 1302 to 1304 permits formation of the m times oversampled FIR filter.

In the equalizing circuit shown in FIG. 13, the m clock inputs 1305 to 1307 of the symbol rate FIR filters 1302 to 1304 are each shifted by a period corresponding to Ts/m. Therefore, the equalizing circuit of FIG. 13 operates as the m times oversampled FIR filter. With this FIR filter, the k/m times FIR filter can be provided by setting the coefficient c under the condition of the above equation (17).

With the oversampled FIR filter shown in FIG. 11, a high-speed clock signal is required whose clock speed corresponds to Ts/m. However, with the structure of FIG. 13, an m times oversampled FIR filter can be provided by a relatively low-speed signal whose clock speed corresponds to Ts, thereby permitting high-speed system operation.

Figure 14:
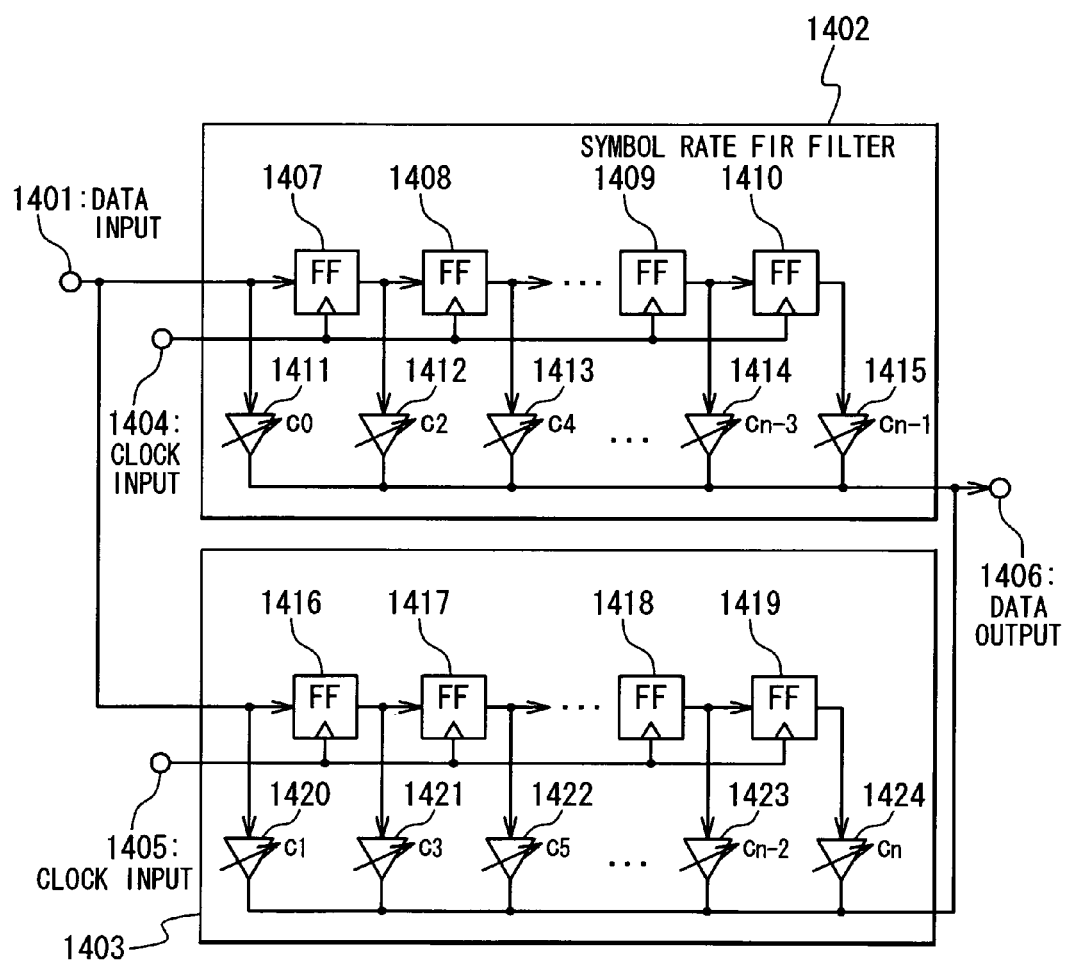
FIG. 14 is a block diagram showing another example of the configuration of the equalizing circuit using the 1.5 times oversampled FIR filter formed with the doubly oversampled FIR filter.

FIG. 14 is a block diagram showing another example of the configuration of the equalizing circuit using a 1.5 times oversampled FIR filter formed with the doubly oversampled FIR filter. Referring to FIG. 14, the equalizing circuit is provided with two symbol rate FIR filters 1402 and 1403. The symbol rate FIR filters 1402 and 1403 have the same structure. The symbol rate FIR filter 1402 is provided with flip-flops 1407 to 1410 and variable output buffers 1411 to 1415. The flip-flops 1407 to 1410 are connected together in series, and sequentially shift a data input 1401 in accordance with a clock input 1404. The variable output buffers 1411 to 1415 amplify input and output data of each stage of the flip-flops 1407 to 1410 in accordance with a predetermined coefficients c. Outputs of the variable output buffers 1411 to 1415 are commonly connected together.

Similarly, the symbol rate FIR filter 1403 is provided with flip-flops 1416 to 1419 and variable output buffers 1420 to 1424. The flip-flops 1416 to 1419 are connected in series, and sequentially shift the data input 1401 in accordance with 6 the clock input 1405. The variable output buffers 1420 to 1424 amplify input and output data of each stage of the flip-flops 1416 to 1419 in accordance with the predetermined coefficients c. Outputs of the variable output buffers 1420 to 1424 are commonly connected together. Further, outputs of the two symbol rate FIR filters 1402 and 1403 are commonly connected together, and the outputted data is subjected to analog addition to thereby provide a data output 1406. The clock inputs 1404 and 1405 of the two symbol rate FIR filters 1402 and 1403 are each shifted by a period corresponding to Ts/2; therefore, the equalizing circuit of FIG. 14 operates as the doubly oversampled FIR filter. With this FIR filter, 1.5 times oversampled FIR filter can be provided by setting the coefficients $c_0$ to $c_n$ under the condition of the formula (13).

Figure 15:
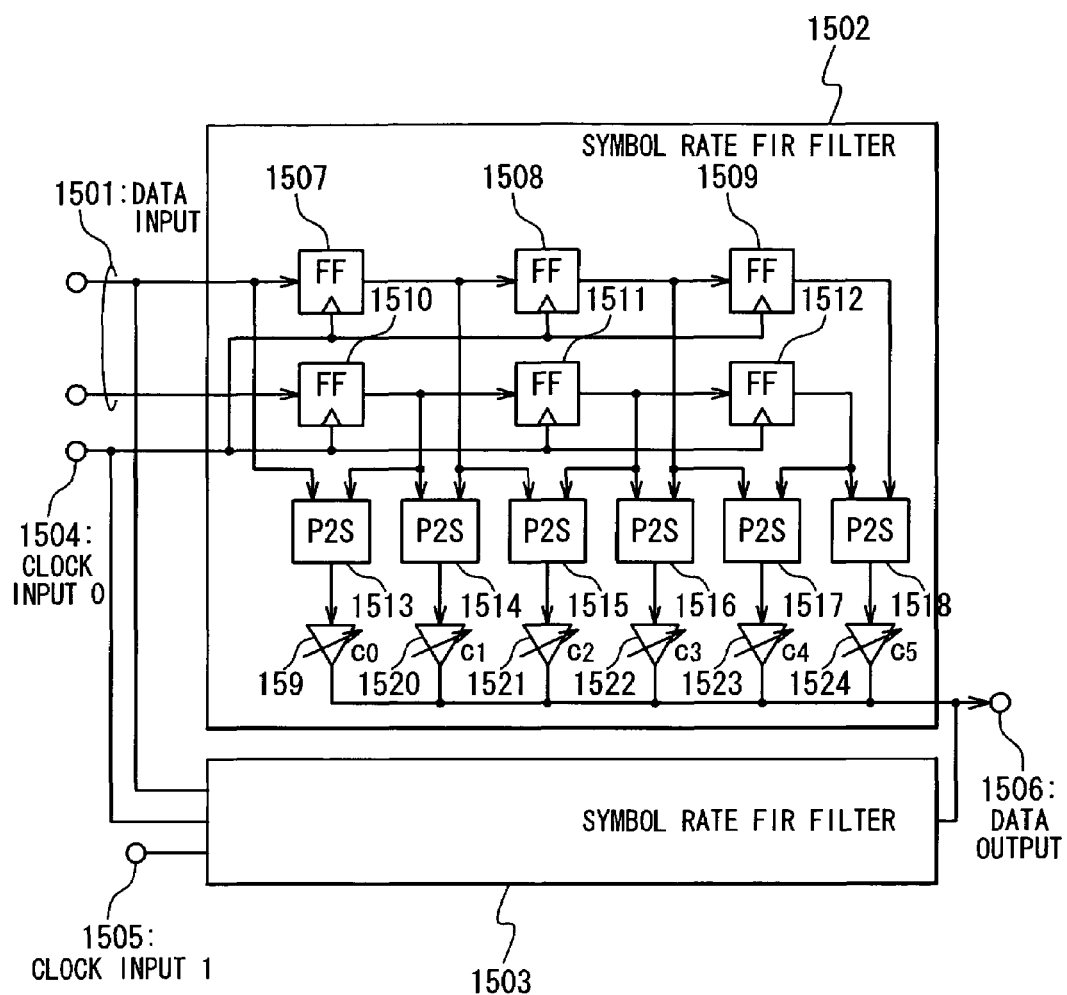
FIG. 15 is a block diagram showing still another example of the structure of the equalizing circuit using the 1.5 times oversampled FIR filter formed from the doubly oversampled FIR filter.

FIG. 15 is a block diagram showing still another example of the configuration of the equalizing circuit using the 1.5 times oversampled FIR filter formed from the doubly oversampled FIR filter. Referring to FIG. 15, the equalizing circuit is provided with two symbol rate FIR filters 1502 and 1503. The symbol rate FIR filters 1502 and 1503 have the same structure. The symbol rate FIR filter 1502 is provided with flip-flops 1507 to 1512, parallel-serial converting circuits (P2S) 1513 to 1518, and variable output buffers 1519 to 1524. To each of the symbol rate FIR filters 1502 and 1503, a parallel data input 1501 including a plurality of data inputs is inputted. The flip-flops 1507 to 1509 are connected together in series, and sequentially shift one data input included in the parallel data input 1501 in accordance with a clock input 1504.

Similarly, flip-flops 1510 to 1509 are connected together in series, and sequentially shift another data input included in the parallel data input 1501 in accordance with the clock data input 1504. The parallel-serial converting circuits 1513 to 1518 perform parallel-serial conversion with inputs of a predetermined plurality of data included in input and output data of each stage of the flip-flops 1507 to 1512. The variable output buffers 1519 to 1524 amplify output data of the parallel-serial converting circuits 1513 to 1518 in accordance with predetermined coefficients $c_0$ to $c_5$. Outputs of the variable output buffers 1519 to 1524 are commonly connected together.

Further, outputs of the two symbol rate FIR filters 1502 and 1503 are commonly connected together and are subjected to analog addition to thereby provide a data output 1506.

The clock inputs 1504 and 1505 of the two symbol rate FIR filters 1502 and 1503 are each shifted by a period corresponding to Ts/2. Therefore, the equalizing circuit of FIG. 15 operates as the doubly oversampled FIR filter. With this FIR filter, the 1.5 times oversampled FIR filter can be provided by setting the coefficients $c_0$ to $c_5$ under the condition of the above equation (13).

With such a structure, the flip-flops 1507 to 1512 can operate at speeds of one half of the speed of FIG. 14, thereby permitting even higher speed operation.

According to the present invention, an equalizing circuit delays data input in the time unit equal to the transition time of the waveform of a single bit response and then weighs data of each stage by adding it. This permits suppressing a decrease in the signal amplitude in an equalizing circuit, thus permitting accurate data determination to be performed on a deciding circuit.

What is claimed is:

1. A partial response transmission system in which a data signal is transmitted from a transmission side to a reception side through a transmission medium, comprising:
    an equalizing circuit provided in said transmission side or said reception side, and configured to adjust a transfer function for an entire system including said transmission medium to a desired transfer function by delaying input data over a plurality of states in units of a period equal to a transition time of a single bit response by said desired transfer function of a partial response transmission and by weighing and adding data in the plurality of stages; and a deciding circuit provided in said reception side and configured to decide an output data from a signal received through said transmission medium through processing under consideration of said desired transfer function, wherein the transition time of the single bit response is equivalent to tap spacing of k/m symbols, where k and m are integers and k is larger than m.

2. The partial response transmission system according to claim 1, wherein said equalizing circuit is provided in said transmission side to equalize a signal for the input data to be transmitted to said transmission medium.

3. The partial response transmission system according to claim 1, wherein said equalizing circuit is provided in said reception side to equalize the signal received through said transmission medium.

4. The partial response transmission system according to claim 3, wherein said equalizing circuit is a decision feed back equalizing circuit comprising said equalizing circuit which equalizes the data output signal to output the equalized signal to an adder as an addition input signal.

5. The partial response transmission system according to claim 1, wherein in said equalizing circuit, a circuit which delays the input data over the plurality of states in units of a period equal to the transition time of the single bit response by said desired transfer function of the partial response transmission and weighs and adds data in the plurality of stages is constituted from an oversampled FIR filter having a rate of a plural times of symbol rate.

6. The partial response transmission system according to claim 5, wherein said oversampled FIR filter comprises:

a delay circuit configured to delay the input data over the plurality of stages at the rate of the plural times of symbol rate; and a weighing and adding circuit configured to weigh the data in the plurality of stages delayed by the delay circuit and to add the weighed data.

7. The partial response transmission system according to claim 5, wherein said oversampled FIR filter comprises:

a plurality of symbol rate FIR filters, each of which delays the input data over the plurality of stages at the symbol rate, weighs the data in the plurality of stages delayed by the delay circuit, and adds the weighed data, and the plurality of symbol rate FIR filters operate in parallel.

8. The partial response transmission system according to claim 1, wherein said equalizing circuit comprises:

a plurality of variable output buffers, each of which amplifies a signal for the input data based on a predetermined coefficient and current- or voltage-adds the amplified signals.

9. The partial response transmission system according to claim 1, wherein said desired transfer function is expressed as $1+z^{-1}$, and the transition time of the single bit response is equivalent to tap spacing of 1.5 symbols.

10. An equalizing circuit provided in a transmission side or a reception side in a partial response transmission, comprising:

a delay section configured to delay input data over a plurality of states in units of a period equal to a transition time of a single bit response by a desired transfer function in the partial response transmission; and a weighing and adding section configured to adjust a transfer function for an entire system including a transmission medium to the desired transfer function by weighing and adding data delayed in the plurality of stages, wherein the transition time of the single bit response is equivalent to tap spacing of k/m symbols, where k and m are integers and k is larger than m.

11. The equalizing circuit according to claim 10, wherein said delay section and said weighing and adding section are constituted from an oversampled FIR filter having a rate of a plural times of symbol rate.

12. The equalizing circuit according to claim 11, wherein said oversampled FIR filter comprises:

a delay circuit configured to delay the input data over the plurality of stages at the rate of the plural times of symbol rate; and a weighing and adding circuit configured to weigh the data in the plurality of stages delayed by the delay circuit and to add the weighed data.

13. The equalizing circuit according to claim 11, wherein said oversampled FIR filter comprises:

a plurality of symbol rate FIR filters, each of which delays the input data over the plurality of stages at the symbol rate, weighs the data in the plurality of stages delayed by the delay circuit, and adds the weighed data, and the plurality of symbol rate FIR filters operate in parallel.

14. The equalizing circuit according to claim 10, wherein said equalizing circuit comprises:

a plurality of variable output buffers, each of which amplifies a signal for the input data based on a predetermined coefficient and current- or voltage-adds the amplified signals.

15. The equalizing circuit according to claim 10, wherein said desired transfer function is expressed as $1+z^{-1}$, and the transition time of the single bit response is equivalent to tap spacing of 1.5 symbols.

* * * * *